Patented June 13, 1939

2,162,201

UNITED STATES PATENT OFFICE 2,162,201

DYESTUFFS AND INTERMEDIATES OF THE PYRAZOLANTHRONE SERIES

Melvin A. Perkins, Milwaukee, and Clifford E. Carr, South Milwaukee, Wis., assignors to E. I. du Pont de Nemours & Company, Wilmington, Del., a corporation of Delaware No Drawing. Application January 25, 1937, Serial No. 122,226

4 Claims. (Cl. 260—312)

This invention relates to the preparation of new and valuable dyestuffs of the dipyrazolanthrone series which dye in bluish red to reddish violet shades of good fastness properties, and to the preparation of new and valuable intermediates used in the manufacture of such dyestuffs.

A number of dyestuffs of the pyrazolanthrone series have been prepared which dye in red shades but which, however, have undesirable dyeing properties. The unsubstituted dipyrazolanthrone dyes cotton in yellow shades which are not fast to alkali. By introducing methyl or ethyl groups on the N-atom of the pyrazole ring of the dipyrazolanthrone molecule, dyestuffs are obtained which dye in red shades that become decidedly bluer on soaping. Halogenation of these N-alkyldipyrazolanthrones improves the property of the colors in regard to soaping but decreases their light fastness to some extent.

It is therefore an object of this invention to prepare new and valuable dyestuffs of the dipyrazolanthrone series which have improved fastness properties over the unsubstituted dialkyldipyrazolanthronyl dyes heretofore described and which dye in desirable bluish red to reddish violet shades. A further object of the invention is to prepare new intermediates of the pyrazolanthrone series from which these new dyestuffs can be produced.

We have found that by introducing methoxy groups into the anthraquinone nuclei of the alkylated dipyrazolanthrones, dyestuffs are obtained which dye in new and desirable shades of bluish red to reddish violet and which exhibit good fastness properties.

The dyestuffs of our invention may be prepared from 1-amino-methoxyanthraquinones or 1-halogen-methoxyanthraquinones in which the methoxy group is in any of the positions 4, 5, 6, 7 and 8. The 1-amino-methoxyanthraquinone is diazotized and the diazonium salt treated by known methods to give the 1-hydrazino-methoxyanthraquinone. The 1-halogen-methoxyanthraquinone may be treated directly with hydrazine hydrate to give the 1-hydrazino-methoxyanthraquinone. The hydrazino compounds are in turn ring-closed to the methoxy-pyrazolanthrone, by any of the usual methods employed for the preparation of pyrazolanthrone compounds. The methoxypyrazolanthrone is then subjected to a condensation in alcoholic potash to give the dimethoxydipyrazolanthronyls, which are in turn alkylated by the usual methods to give dyestuffs which dye cotton from blue vats in bluish red to reddish violet shades, depending upon the particular position of the methoxy substituents. Halogenation of these new methoxy dyestuffs improves the brightness of their dyeings.

The following examples are given to more fully illustrate the invention. The parts used are by weight.

Example 1

Cool 10 parts of 98% sulfuric acid to 10 to 20° C. and sift in 0.3 part of sodium nitrite slowly under efficient agitation so as to avoid loss of nitrous acid. Add 1 part of 1-amino-4-methoxyanthraquinone and agitate at about 20° C. until a test sample shows complete diazotization of the mass. Drown on 29.2 parts of ice and water containing 1.25 parts of sodium sulfate (anhydrous Na2SO4). Let the mixture stand for about 15 minutes so as to allow the diazonium sulfate to crystallize out, filter and suck the cake firm. Slurry this cake in about 15 parts of cold water and add slowly to 35 parts of cold water containing 1 part of anhydrous sodium sulfite (Na2SO3) and 1.5 parts of soda ash. Agitate for 15 minutes at 10° C., heat slowly to about 90° C. and maintain this temperature for 1 hour. Acidify slowly with 10 parts of hydrochloric acid (31%), under efficient agitation. Heat the acidified mass until no more sulfur dioxide is evolved, cool somewhat, filter, wash acid-free and dry.

The 4-methoxypyrazolanthrone which results from the above reaction is a light brown powder which dissolves in concentrated sulfuric acid giving a yellow color in thin layers with a green fluorescence. It may be purified by recrystallization from nitrobenzene. It has the following formula

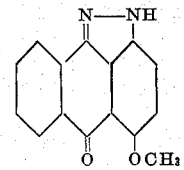

Example 2

1-hydrazino-6-methoxyanthraquinone is prepared in a manner analogous to Example 1 from 1-amino-6-methoxyanthraquinone, with the exception that in this case the 1-hydrazino-6-methoxyanthraquinone must be subjected to a further treatment to effect ring-closure, as follows:

Dissolve 1 part of 1-hydrazino-6-methoxyanthraquinone in 10 parts of 100% sulfuric acid, heat to about 45° C. and maintain this temperature for 4 hours. Cool and dilute slowly with 10 parts of cold water keeping the temperature below 30° C., filter, wash acid-free and dry. The resulting 6-methoxypyrazolanthrone gives a reddish brown color in concentrated sulfuric acid. It has the following formula

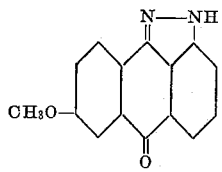

If 1-amino-5-methoxyanthraquinone is used in the above example, 5-methoxypyrazolanthrone giving a claret-red color with a blue cast in concentrated sulfuric acid is obtained.

*Example 3*

Cool 3 parts of 98% sulfuric acid to 10 to 20° C. and sift in 0.3 part of sodium nitrite slowly under efficient agitation so as to avoid loss of nitrous acid. Add slowly 1 part of 1-amino-8-methoxyanthraquinone and agitate at about 20° C. until completely diazotized. Drown the diazotized mass on 20 parts of ice and water and add slowly to 60 parts of ice and water containing 5 parts of soda ash and 1 part of anhydrous sodium sulfite. Agitate for 1 hour cold and then heat to 90° C. and maintain this temperature for 1 to 2 hours. Acidify slowly with 10 parts of hydrochloric acid, heat to 95° C. and maintain this temperature until sulfur dioxide is no longer evolved. Filter, wash acid-free and dry. 1-hydrazino-8-methoxyanthraquinone results.

Dissolve 1 part of the 1-hydrazino-8-methoxyanthraquinone obtained above in 8 parts of 98% sulfuric acid and heat to about 45° C., and maintain this temperature for 3 hours. Cool and drown the mass in 30 to 40 parts of cold water, filter, wash acid-free and dry.

The resulting 8-methoxypyrazolanthrone may be recrystallized from nitrobenzene. It dissolves with a blue-violet color in concentrated sulfuric acid and has the following formula:

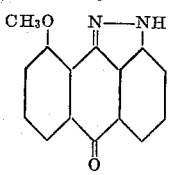

The temperatures and quantities of reactants used in the previous examples may be varied within reasonable limits without materially affecting the resulting products. In the case of the diazotization of the intermediate, this may also be accomplished by dissolving the intermediate in sulfuric acid and subsequently diazotizing by the addition of sodium nitrite. Potassium sulfite and other alkaline media, such as potassium carbonate, may be used in the preparation of the hydrazinomethoxyanthraquinones. Ring-closure of the pyrazolanthrones may be carried out in various strengths of sulfuric acid or in other ring-closing media, such as aniline hydrochloride, etc.

4-methoxypyrazolanthrone may also be prepared from 4-bromopyrazolanthrone by treatment of the latter compound with sodium methylate in methyl alcohol.

The 2, 3 or 7-methoxypyrazolanthrones may be made from the corresponding 1-amino-2, 3 or 7-methoxyanthraquinones by a procedure similar to the above examples.

*Example 4*

Mix 10 parts of caustic potash and 3 parts of 95% ethyl alcohol and heat to 130° C. under efficient agitation and a reflux condenser, until a smooth melt is obtained. Sift in 1 part of 4-methoxypyrazolanthrone (described in Example 1, above). Heat to 185° C. and maintain this temperature for a 4 hour period. Cool and drown in 200 parts of water, heat to 70° C. and aerate until all of the dyestuff is precipitated. Filter and wash with hot water and dry. The 4,4'-dimethoxydipyrazolanthronyl of the formula

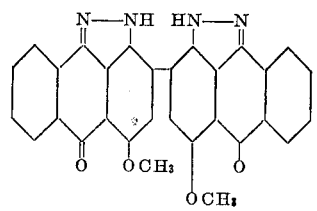

resulting gives a reddish orange color in concentrated sulfuric acid and dyes cotton a reddish yellow from a bluish green vat.

Add 1 part of the 4,4'-dimethoxydipyrazolanthronyl to 10 parts of nitrobenzene to which 2 parts of soda ash are added. Heat to 180° C. and maintain this temperature. Drip in 1.2 parts of diethyl sulfate over 1 to 2 hours, and agitate for several hours or until a test sample shows the dyestuff to be alkali-fast. Cool to about 90° C. and filter, wash with alcohol and hot water and dry. The resulting 4,4'-dimethoxy-N,N'-diethyl-dipyrazolanthronyl of the probable formula

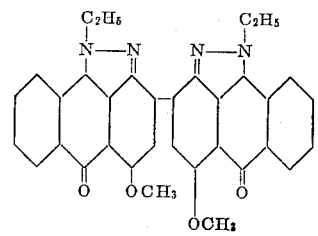

gives a reddish brown color in concentrated sulfuric acid and dyes cotton a bluish red from a bluish green vat. It posseses good bleach and light fastness properties.

The corresponding dimethyl derivative may be prepared by using dimethylsulfate in the above example.

*Example 5*

Mix 10 parts of caustic potash and 8 parts of ethyl alcohol and heat under a reflux condenser with good agitation until a smooth melt results. Cool to 100° C. and sift in 1 part of 6-methoxypyrazolanthrone (described in Example 2, above). Heat to about 125° C. and maintain this temperature for 1 hour or until fusion is complete. Drown the fusion mass in 150 parts of water, aerate at 75° C. until all the dyestuff is precipitated, filter, and wash with hot water and suck the cake firm. The resulting 6,6'-dimethoxydipyrazolanthronyl gives a reddish brown color with a slight fluorescence in concentrated sulfuric acid. It dyes cotton a yellowish brown from a greenish blue vat.

Slurry the press cake obtained above in 13 parts of nitrobenzene (all parts based on weight of 6-methoxypyrazolanthrone used), together with 3.5 parts of potassium carbonate. Heat slowly to about 180° C. and maintain this temperature. When the melt is dehydrated, drip in 2 parts of dimethylsulfate over a 2 hour period and agitate for several hours longer or until a test sample shows the product to be alkali-fast. Let cool, filter, wash with nitrobenzene, alcohol and hot water, and dry. The resulting 6,6'-dimethoxy-N,N'-dimethyldipyrazolanthronyl is a bronzy brown crystalline powder, giving a yellowish brown color in concentrated sulfuric acid. It dyes cotton a reddish violet from a greenish blue vat and has excellent fastness properties in general.

The 6,6'-dimethoxydipyrazolanthrone may be ethylated as follows:

Slurry the aqueous press cake from the fusion, as obtained above, in 15 parts of nitrobenzene (all parts based on weight of 6-methoxypyrazolanthrone originally employed) containing 3 parts of soda ash and heat to 180° C. When dehydrated drip in 1 part of diethylsulfate over a 2 hour period and proceed as in the above methylation. The resulting 6,6'-dimethoxy-N,N'-diethyldipyrazolanthronyl gives a reddish yellow, slightly fluorescent color in concentrated sulfuric acid. It dyes cotton a reddish violet shade from a greenish blue vat. Its properties are similar to the dimethyl derivative.

Example 6

Heat 10 parts of caustic potash and 10 parts of ethyl alcohol under a reflux condenser, with efficient agitation, until a smooth melt results. Cool somewhat and sift in 1 part of 8-methoxypyrazolanthrone (Example 3, above). Heat to 116° C. and maintain this temperature for 2 to 3 hours, or until the fusion is complete. A bluish violet melt results. Drown in 200 parts of water, aerate at 70° C. until the dyestuff is precipitated, filter, wash and dry. The resulting 8,8'-dimethoxydipyrazolanthronyl gives a green color in concentrated sulfuric acid and dyes cotton a reddish violet from a bluish green vat.

Add 1 part of the 8,8'-dimethoxydipyrazolanthronyl obtained to 10 parts of nitrobenzene containing 2 parts of soda ash. Heat to 180° C. and, maintaining this temperature, drip in 1.2 parts of diethylsulfate over a 2 hour period, and hold for 1 to 2 hours, or until a test sample shows the dyestuff to be alkali-fast. Let cool, filter, wash with alcohol and hot water and dry. The resulting 8,8' - dimethoxy - N,N' - diethyldipyrazolanthronyl is a bronzy green crystalline product giving a green color in concentrated sulfuric acid and dyes cotton a reddish violet from a bluish green vat.

We do not limit ourselves to the temperatures or quantities of reactants given in the above examples. Methyl or normal butyl alcohols can be substituted for ethyl alcohol. Caustic soda may be used in place of potash. Diluents such as solvent naphtha, naphthalene, kerosene, etc., may be used in the fusion of the methoxypyrazolanthrones.

Alkyl groups other than methyl and ethyl may be introduced by the general alkylation procedure described above by substituting, for the dimethyl or diethyl sulfates there used, the p-toluene sulfonates of the following alcohols: methyl, ethyl, n-propyl, iso-propyl, n-butyl, iso-butyl, amyl, isoamyl, acetyl, lauryl, cetyl, 2-chloroethyl, 2-methyl pentanol, 2-ethyl hexanol, benzyl, phenylethyl, or other alkylating agents such as dichloroethylether, chloroacetone, phenacyl chloride, etc.

Mixed N,N'-dialkyl derivatives may also be obtained by partial alkylation, isolation of the monoalkyl derivatives, and completion of the alkylation to an alkali-fast dyestuff by the above p-toluene sulfonates, preferably by use of the potassium salt of the monoalkyl derivatives. For this purpose, the p-toluene sulfonates of other secondary alcohols such as di-isopropyl-carbinol, secondary butyl alcohol, diethyl carbinol, methyl n-butyl carbinol, acetyl methyl carbinol, methyl hexyl carbinol and cyclohexanol can also serve. The various products obtained fall in the shade range of bluish red to reddish violet.

The 5 and the 7-methoxypyrazolanthrones may be fused to the corresponding dimethoxydipyrazolanthronyls and subsequently alkylated, in the same manner as the 4, 6 and 8 isomers illustrated above.

The dimethoxy -N,N'- dialkyldipyrazolanthronyls may be also halogenated to give new vat dyestuffs of improved brightness. The following example is given to illustrate this procedure.

Example 7

Dissolve 1 part of 6,6'-dimethoxy-N,N'-dimethyldipyrazolanthronyl in 30 parts of sulfuric acid monohydrate containing 0.1 part of iodine. Heat to 45-50° C. and pass in chlorine gas until the desired degree of halogenation is obtained. The mass is then drowned in water, filtered and washed acid-free. This product may be prepared directly into a color paste. The introduction of from 1 to 4 atoms of chlorine gives products which dye yellower and brighter than the unchlorinated compounds. Any of the other isomeric compounds, as well as their alkyl homologues, may be halogenated in a similar manner.

We claim:

1. As new products, dimethoxy-N,N'-dialkyldipyrazolanthronyls, in which the methoxy groups are present in one of the pairs of positions, 6,6', and 8,8', and their halogenation products, which compounds contain no additional substituents.

2. As new products, 6,6'-dimethoxy-N,N'-dialkyldipyrazolanthrones, which compounds contain no additional substituents.

3. 6,6'-dimethoxy - N,N' - diethyl-dipyrazolanthrone.

4. The process which comprises diazotizing a 1-aminoanthraquinone which carries a methoxy group in one of the positions 4, 5, 6, 7 and 8, but which carries no additional substituents, reacting the diazonium compound with an alkali-metal sulfite to convert it to the methoxyanthraquinone-1-hydrazine, ring-closing the hydrazine to the pyrazolanthrone, subjecting the methoxypyrazolanthrone to an alkaline condensation to connect the same to the dimethoxydipyrazolanthronyl, and alkylating the resulting dimethoxydipyazolanthronyl with an alkylating agent by the procedure normally employed in the introduction of alkyl groups on the N atoms of the pyrazole rings.

MELVIN A. PERKINS.
CLIFFORD E. CARR.

Certificate of Correction

Patent No. 2,162,201. June 13, 1939.

MELVIN A. PERKINS ET AL.

It is hereby certified that error appears in the printed specification of the above numbered patent requiring correction as follows: Page 2, second column, lines 14 to 20, in the second half of the formula, for

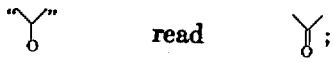

page 3, second column, line 60, claim 4, for the word "connect" read *convert;* and that the said Letters Patent should be read with these corrections therein that the same may conform to the record of the case in the Patent Office.

Signed and sealed this 18th day of July, A. D. 1939.

[SEAL]

HENRY VAN ARSDALE,
*Acting Commissioner of Patents.*